J. Absterdam.
Furnace for Treating Metals.
№ 86,796.   Patented Feb. 9, 1869.

Witnesses:
Geo. W. Rothwell
Phil. F. Larner

Inventor:
Jno. Absterdam
By Gledenheim & Co
Attys

JOHN ABSTERDAM, OF NEW YORK, N. Y.

Letters Patent No. 86,796, dated February 9, 1869.

IMPROVEMENT IN THE CONSTRUCTION OF CONVERTERS AND FURNACES FOR TREATING IRON AND OTHER METALS.

The Schedule referred to in these Letters Patent and making part of the same.

*To all whom it may concern:*

Be it known that I, JOHN ABSTERDAM, of the city, county, and State of New York, have invented a new and useful Improvement in the Construction of Converters, and other Furnaces; and I do hereby declare the following to be a full, clear, and exact description thereof, sufficient to enable those skilled in the art to which my invention appertains, to fully understand and use the same, reference being had to the accompanying drawings, forming part of this specification, and in which—

Figure 1:
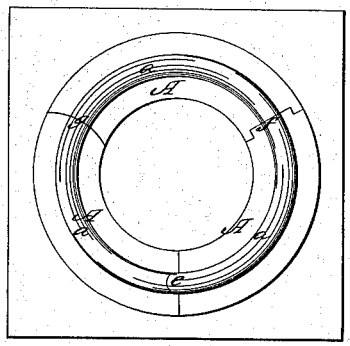
Figure 3:
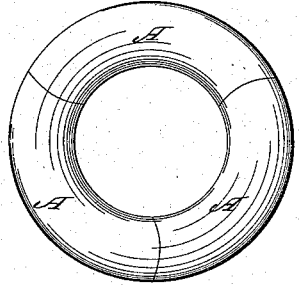
Figure 5:
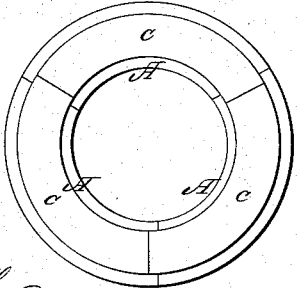

Figures 1, 3, and 5, are top views, and

Figure 2:
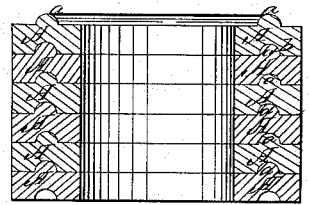
Figure 4:
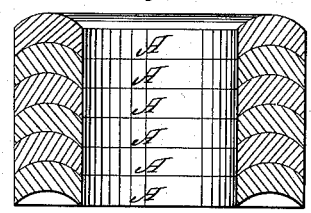
Figure 6:
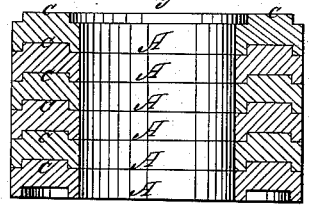

Figures 2, 4, and 6, are vertical sections of figs. 1, 3, and 5, respectively.

My invention relates to the construction of converters, and other furnaces, and is an improvement in the mode of constructing the fire-walls of such furnaces.

It consists in constructing such walls in sections or segments, so formed as to interlock, one with another, so as to constitute a very solid wall, which can be built in a short time, as will hereinafter be fully described.

Similar letters of reference indicate corresponding parts in the several figures of the drawings.

I construct the fire-walls in sections, A A, of some refractory material, as that, for instance, of which ordinary fire-bricks or crucibles are made.

These sections may be formed, as shown in figs. 1 and 2, with a rounded bead, *a*, on the upper side, and a corresponding concavity on the under side, adapted to receive the bead *a* of the section below.

The bead *a* and the corresponding concave groove *b* extend entirely around the section, following the curve of the same.

In figs. 3 and 4, I have shown the sections made with the upper surface convex from side to side, and the under surface in the same manner made concave, to fit the upper surface of the section next below.

Figs. 5 and 6 represent the sections formed with a square bead, *c*, on top, and a corresponding groove in the under side.

In fig. 1, I have shown three forms of joints for securing the sections together at their ends.

It will be observed that the joint *e* is formed by a projecting rounded bead entering a corresponding concavity. At *f* the bead is square, and at *g*, the end of one section is made convex to fit the concave end of that adjoining. It will thus be seen that the ends of the sections are formed like the upper and under sides of the same.

In constructing a wall with my sections, I place them, one on top the other, so as to break joints.

The ends being interlocked, the sections are prevented from either lateral or longitudinal movement, and a solid, self-sustaining structure is produced.

I do not confine myself to the joints which are shown for interlocking the ends of the sections, nor to the precise construction of the upper and under sides of the sections themselves, as I am aware that these may be varied without departing from the principle of my invention.

Having thus described my invention,

What I claim as new, and desire to secure by Letters Patent, is—

Constructing the walls of converters and other furnaces of separate sections or segments, so formed as to interlock, one with another, substantially as herein described and represented.

JOHN ABSTERDAM.

Witnesses:
GEO. A. ROTHWELL,
PHIL. F. LARNER.